(12) United States Patent
Cheng et al.

(10) Patent No.: US 9,400,410 B2
(45) Date of Patent: Jul. 26, 2016

(54) DISPLAY PANEL AND DISPLAY DEVICE

(71) Applicant: AU OPTRONICS CORP., Hsin-Chu (TW)

(72) Inventors: Wei-Ming Cheng, Hsin-Chu (TW); Hsiao-Wei Cheng, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 193 days.

(21) Appl. No.: 14/285,846

(22) Filed: May 23, 2014

(65) Prior Publication Data

US 2015/0192831 A1 Jul. 9, 2015

(30) Foreign Application Priority Data

Jan. 7, 2014 (TW) .............................. 103100519 A

(51) Int. Cl.
*G02F 1/1335* (2006.01)
*G02F 1/1343* (2006.01)

(52) U.S. Cl.
CPC .................... *G02F 1/134363* (2013.01); *G02F 2001/133614* (2013.01)

(58) Field of Classification Search
None
See application file for complete search history.

(56) References Cited

U.S. PATENT DOCUMENTS

| | | | |
|---|---|---|---|
| 6,542,212 B2 | 4/2003 | Yoshida et al. | |
| 6,738,125 B2 | 5/2004 | Yamada et al. | |
| 2003/0184699 A1* | 10/2003 | Matsumoto | G02F 1/134363 349/141 |
| 2004/0085278 A1* | 5/2004 | Chae | G02F 1/134363 345/90 |
| 2004/0189925 A1 | 9/2004 | Ohmuro et al. | |
| 2005/0052590 A1* | 3/2005 | Ochiai | G02B 6/0068 349/71 |
| 2005/0068477 A1 | 3/2005 | Shin et al. | |
| 2005/0078261 A1 | 4/2005 | Ono et al. | |
| 2006/0066798 A1* | 3/2006 | Hwang | G02F 1/134363 349/141 |
| 2008/0128735 A1* | 6/2008 | Yoo | C09K 11/0883 257/98 |
| 2008/0205058 A1 | 8/2008 | Park et al. | |
| 2009/0225267 A1 | 9/2009 | Atarashiya et al. | |
| 2012/0062810 A1 | 3/2012 | Lee et al. | |
| 2012/0104404 A1* | 5/2012 | Kwack | H01L 27/1288 257/72 |
| 2012/0147285 A1* | 6/2012 | Seong | G02F 1/133707 349/43 |
| 2012/0169985 A1* | 7/2012 | Kim | G02F 1/136227 349/139 |
| 2013/0257700 A1* | 10/2013 | Chang | G02R 1/134363 345/87 |

FOREIGN PATENT DOCUMENTS

| | | |
|---|---|---|
| CN | 101907800 | 12/2010 |
| CN | 101526704 B | 6/2011 |
| CN | 102402079 | 4/2012 |
| CN | 101256310 B | 5/2012 |

(Continued)

*Primary Examiner* — Ryan Crockett
(74) *Attorney, Agent, or Firm* — WPAT, PC; Justin King

(57) ABSTRACT

A display panel for a display device having a backlight module includes a first substrate, a plurality of data lines, a plurality of pixel electrodes, a dielectric layer, and a common electrode. The data lines are disposed substantially in parallel on the first substrate. The pixel electrodes are respectively disposed between the data lines. The dielectric layer covers the pixel electrodes and the data lines. The common electrode is disposed on the dielectric layer, and the common electrode has two first electrode branches, two second electrode branches, and two third electrode branches. The electrode branches are respectively and correspondingly disposed on the both sides of the pixel electrodes. The first electrode branches, the second electrode branches, and the third electrode branches respectively have a first interval, a second interval, and a third interval therebetween. The first interval is larger than the second interval and the third interval.

19 Claims, 6 Drawing Sheets

(56) References Cited

FOREIGN PATENT DOCUMENTS

| TW | I284232 | 7/2007 |
| TW | 200837474 | 9/2008 |
| TW | 201222022 | 6/2012 |

* cited by examiner

DISPLAY PANEL AND DISPLAY DEVICE

RELATED APPLICATIONS

This application claims priority to Taiwan Application Serial Number 103100519, filed Jan. 7, 2014, which are herein incorporated by reference.

BACKGROUND

A liquid crystal display (LCD) is a flat panel displaying device that is made up of a certain number of segments filled with liquid crystals and arrayed in front of a light source or a reflector to produce images in color or monochrome. Compared with traditional display based on a cathode ray tube (CRT), the LCD is more energy efficient and safer, and thus has become the mainstream in the market.

The LCD includes a backlight module, a liquid crystal layer, a polarizer, and color filter layers. Grayscale and brightness of each pixel are controlled by adjusting a polarization direction of a backlight through the liquid crystal layer and filtering the backlight with a different polarization direction with polarizers. Then, a light of desired color is generated by filtering unwanted components of the backlight with the color filter layers. However, many components of the backlight which may be not unwanted are also filtered, such that the brightness of the LCD becomes much weaker than that of the original backlight. For a high pixel per inch (PPI) LCD, if the brightness of the high PPI LCD is enhanced, its comprehensive performance may be significantly improved accordingly.

Further, a high efficiency backlight module of the LCD usually uses a blue light-emitting diode in association with a yellow phosphor layer. Afterwards, a blue light from the blue light-emitting diode and a yellow light from the yellow phosphor layer mix with each other and become a yellowish white light. Such backlight module requires a display panel having a special electrode design for adjusting the yellowish white light to achieve the best optical match.

SUMMARY

This disclosure provides a display panel to enhance the display brightness and chromaticity and to achieve a better optical match.

In one aspect of the disclosure, a display panel for a display device having a backlight module is provided. The display panel includes a first substrate, a scan line, a plurality of data lines, a first active component, a second active component, a third active component, a first pixel electrode, a second pixel electrode, a third pixel electrode, a dielectric layer, a common electrode, a second substrate, and a display medium layer. The scan line is disposed on the first substrate. The data lines are disposed substantially in parallel on the first substrate. The first active component, the second active component, and the third active component are electrically connected to the scan line and are respectively and electrically connected to the corresponding data lines. The first pixel electrode, the second pixel electrode, and the third pixel electrode are respectively disposed between the data lines and are respectively and electrically connected to the first active component, the second active component, and the third active component. The dielectric layer is disposed on the first substrate and covers the first pixel electrode, the second pixel electrode, the third electrode, and the data lines. The common electrode is disposed on the dielectric layer and has a pair of first electrode branches, a pair of second electrode branches, and a pair of third electrode branches. The first electrode branches, the second electrode branches, and the third electrode branches are respectively and correspondingly disposed on both sides of the first pixel electrode, the second pixel electrode, and the third pixel electrode and are respectively and partially disposed above the data lines. The pair of the first electrode branches have a first interval therebetween. The pair of the second electrode branches have a second interval therebetween. The pair of the third electrode branches have a third interval therebetween. The first interval is greater than the second interval, and the first interval is greater than the third interval. The second substrate is disposed opposite to the first substrate. The display medium layer is disposed between the first substrate and the second substrate.

In one or more embodiments, the first electrode branches, the second electrode branches, and the third electrode branches on the first substrate at least partially overlap with the data lines respectively in a projection direction.

In one or more embodiments, the first electrode branches, the second electrode branches, and the third electrode branches neighboring to each other are connected to each other.

In one or more embodiments, the common electrode has a plurality of connecting portions connecting the first electrode branches, the second electrode branches, and the third electrode branches, the data lines have a plurality of corresponding center lines, and the connecting portions on the first substrate overlap with the center lines in the projection direction.

In one or more embodiments, distances between the data lines approximately equal to each other.

In one or more embodiments, the first electrode branches, the second electrodes, and the third electrode branches respectively have a first electrode width, a second electrode width, and a third electrode width, the first electrode width is smaller than the second electrode width, and the first electrode width is smaller than the third electrode width.

In one or more embodiments, the first electrode width is smaller than the second electrode width and the third electrode width of at least about 1 μm.

In one or more embodiments, the display panel further includes a first color filter layer, a second color filter layer, and a third color filter layer respectively disposed corresponding to the first pixel electrode, the second pixel electrode, and the third pixel electrode. A wavelength of a light passing through the first color filter layer is shorter than wavelengths of light passing through the second color filter layer and from the third color filter layer.

In one or more embodiments, the first color filter layer is a blue filter layer, the second color filter layer is a green filter layer, and the third color filter layer is a red filter layer.

In one or more embodiments, the display panel further includes a light shading layer disposed between two of the first color filter layer, the second color filter layer, and the third color filter layer.

In one or more embodiments, the light shading layer on the first substrate overlaps with the data lines in the projection direction.

In one or more embodiments, a thickness of the light shading layer is greater than thicknesses of the first color filter layer, the second color filter layer, and the third color filter layer.

In one or more embodiments, the display panel further includes a plurality of common electrode branches respectively disposed above the first pixel electrode, the second pixel electrode, and the third pixel electrode.

In one or more embodiments, the display medium layer includes a liquid crystal layer.

In another aspect of the disclosure, a display device is provided. The display device includes the display panel and a backlight module. The backlight module is disposed on an outer side of the first substrate, such that the first substrate is disposed between the display medium layer and the backlight module.

In one or more embodiments, the backlight module emits a backlight with a specific spectrum, such that the display device displays a white light when the first pixel electrode, the second pixel electrode, and the third pixel electrode are all turned on.

In one or more embodiments, the display device further includes a first color filter layer, a second color filter layer, and a third color filter layer respectively disposed corresponding to the first pixel electrode, the second pixel electrode, and the third pixel electrode. A wavelength of a light passing through the first color filter layer is shorter than wavelengths of light passing through the second color filter layer and from the third color filter layer.

In one or more embodiments, the first color filter layer is a blue filter layer, the second color filter layer is a green filter layer, and the third color filter layer is a red filter layer.

In one or more embodiments, the backlight module includes at least one blue light-emitting diode and a yellow phosphor layer. The thickness of the yellow phosphor layer matches the blue light-emitting diode, such that a light emitted by the blue light-emitting diode becomes a yellowish white light after passing the yellow phosphor layer.

In one or more embodiments, the yellowish white light becomes an adjusted white light after passing the display panel when the first pixel electrode, the second pixel electrode, and the third pixel electrode are all turned on.

By adjusting the intervals between electrode branches of the high pixel per inch (PPI) display panel, a blue light transmittance is larger than a red light transmittance and a green light transmittance. Therefore, when the backlight module adjusts a proportion of the phosphor, such as the yellow phosphor, to enhance a display brightness and chromaticity of the backlight module, a yellowish white light emitted by the backlight module becomes a desired white light after the yellowish white passes the display panel with the higher blue light transmittance, and the display brightness and chromaticity of the display panel is enhanced as well.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
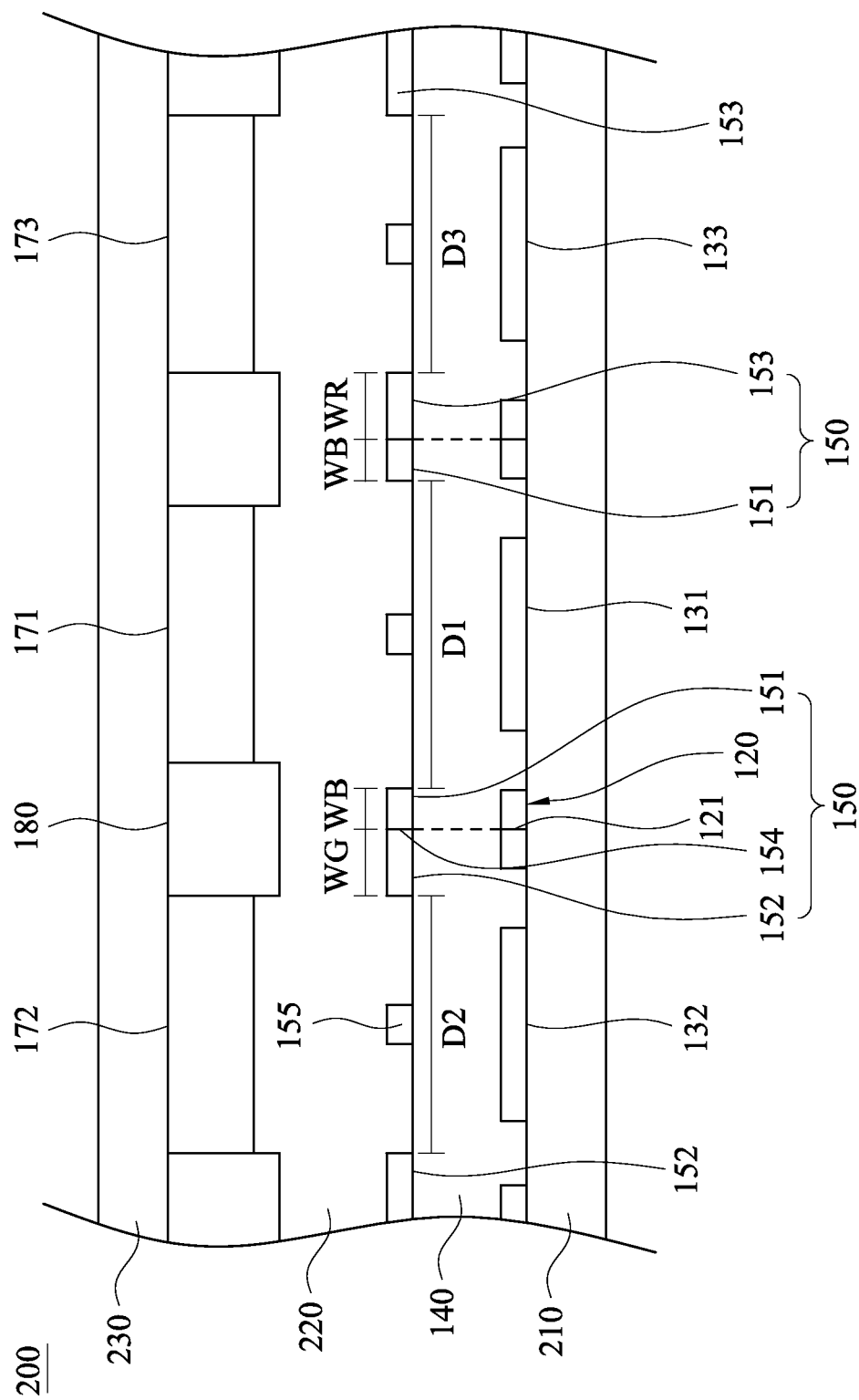
FIG. 1 is a cross-sectional view of a display panel according to one embodiment of this invention.
Figure 2:
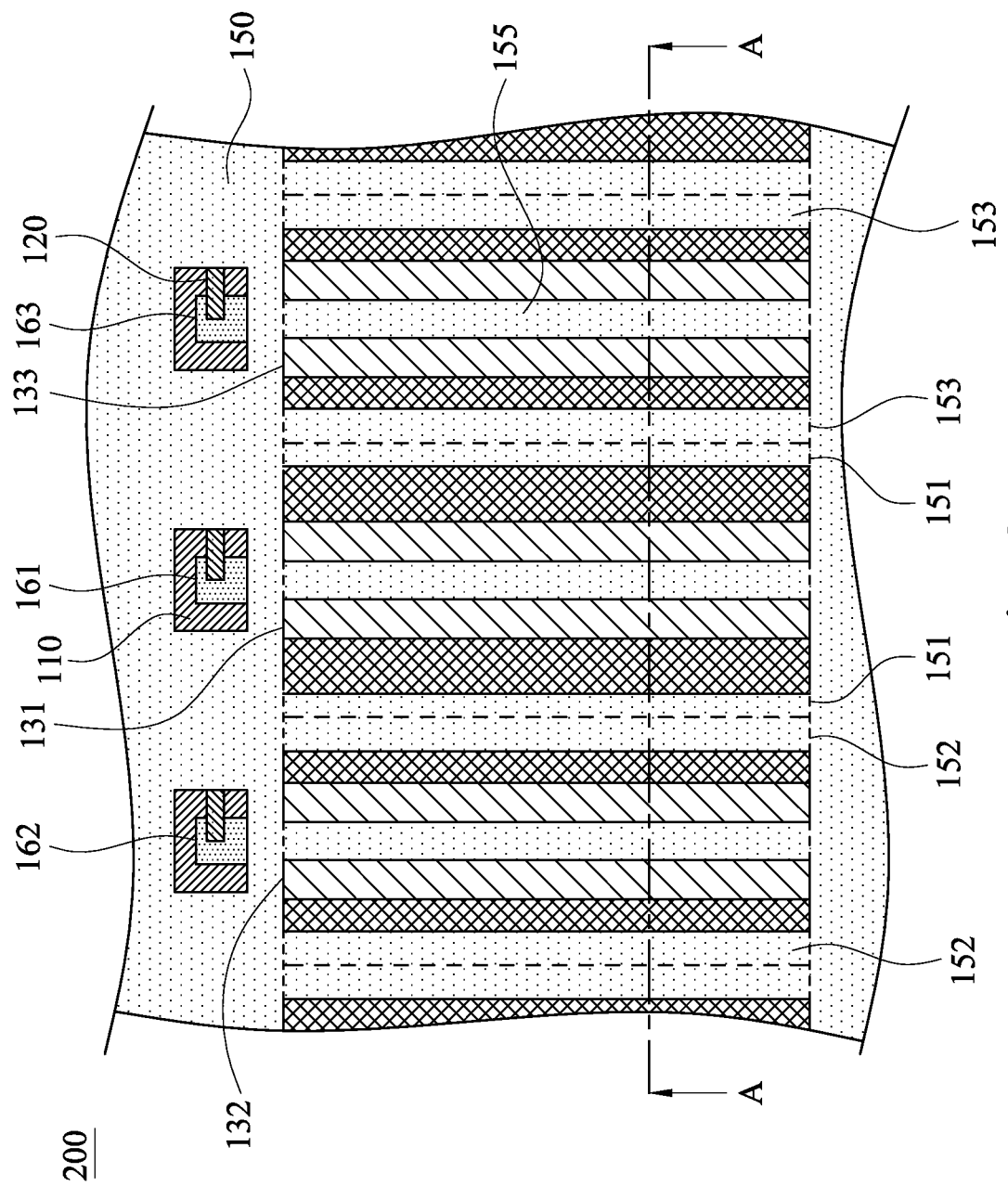
FIG. 2 is a partial top view of the display panel of FIG. 1.

FIG. 1 is a cross-sectional view of a display panel 200 according to one embodiment of this invention. FIG. 2 is a partial top view of the display panel 200 of FIG. 1. As shown in FIG. 1 and FIG. 2, a display panel 200 is provided. The display panel 200 includes a first substrate 210, a second substrate 230, and a display medium layer 220 disposed between the first substrate 210 and the second substrate 230. The display panel 200 further includes a plurality of scan lines 110 disposed on the first substrate 210, a plurality of data lines 120, a first active component 161, a second active component 162, a third active component 163, a first pixel electrode 131, a second pixel electrode 132, a third pixel electrode 133, a dielectric layer 140, and a common electrode 150. The scan lines 110 are disposed substantially in parallel on the first substrate 210. The data lines 120 are parallelly disposed on the first substrate 210 and intersect with the scan lines 110.

The first active component 161, the second active component 162, and the third active component 163 are electrically connected to the scan lines 110 and are respectively and electrically connected to the corresponding data lines 120. The first pixel electrode 131, the second pixel electrode 132, and the third pixel electrode 133 are respectively disposed between the data lines 120 and are respectively and electrically connected to the first active component 161, the second active component 162, and the third active component 163.

The dielectric layer 140 is disposed on the first substrate 210 and covers the first pixel electrode 131, the second pixel electrode 132, the third electrode 133, and the data lines 120. The common electrode 150 is disposed on the dielectric layer 140 and has a pair of first electrode branches 151, a pair of second electrode branches 152, and a pair of third electrode branches 153. The first electrode branches 151, the second electrode branches 152, and the third electrode branches 153 are respectively and correspondingly disposed on both sides of the first pixel electrode 131, the second pixel electrode 132, and the third pixel electrode 133 and are respectively and partially disposed above the data lines 120. A first interval D1, a second interval D2, and a third interval D3 are respectively situated between the pair of the first electrode branches 151, the pair of the second electrode branches 152, and the pair of the third electrode branches 153. The first interval D1 is greater than the second interval D2, and the first interval D1 is greater than the third interval D3. The second substrate 230 is disposed opposite to the first substrate 210. The display medium layer 220 is disposed between the first substrate 210 and the second substrate 230.

The display panel 200 further includes a first color filter layer 171, a second color filter layer 172, and a third color filter layer 173 respectively disposed corresponding to the first pixel electrode 131, the second pixel electrode 132, and the third pixel electrode 133. Because the first interval D1 is greater than the second interval D2 and the third interval D3, a brightness of a backlight passing the display medium layer 220 and emitting from the first color filter layer 171 is greater than a brightness of a backlight passing the display medium layer 220 and emitting from the second color filter layer 172 or from the third color filter layer 173.

The display medium layer 220 includes but not limits to a liquid crystal layer. The display medium layer 220 can be an electro-wetting material layer or an electrophoretic material layer as well. People having ordinary skill in the art can make proper modification to the display medium layer 220 according to their actual needs.

Figure 3:
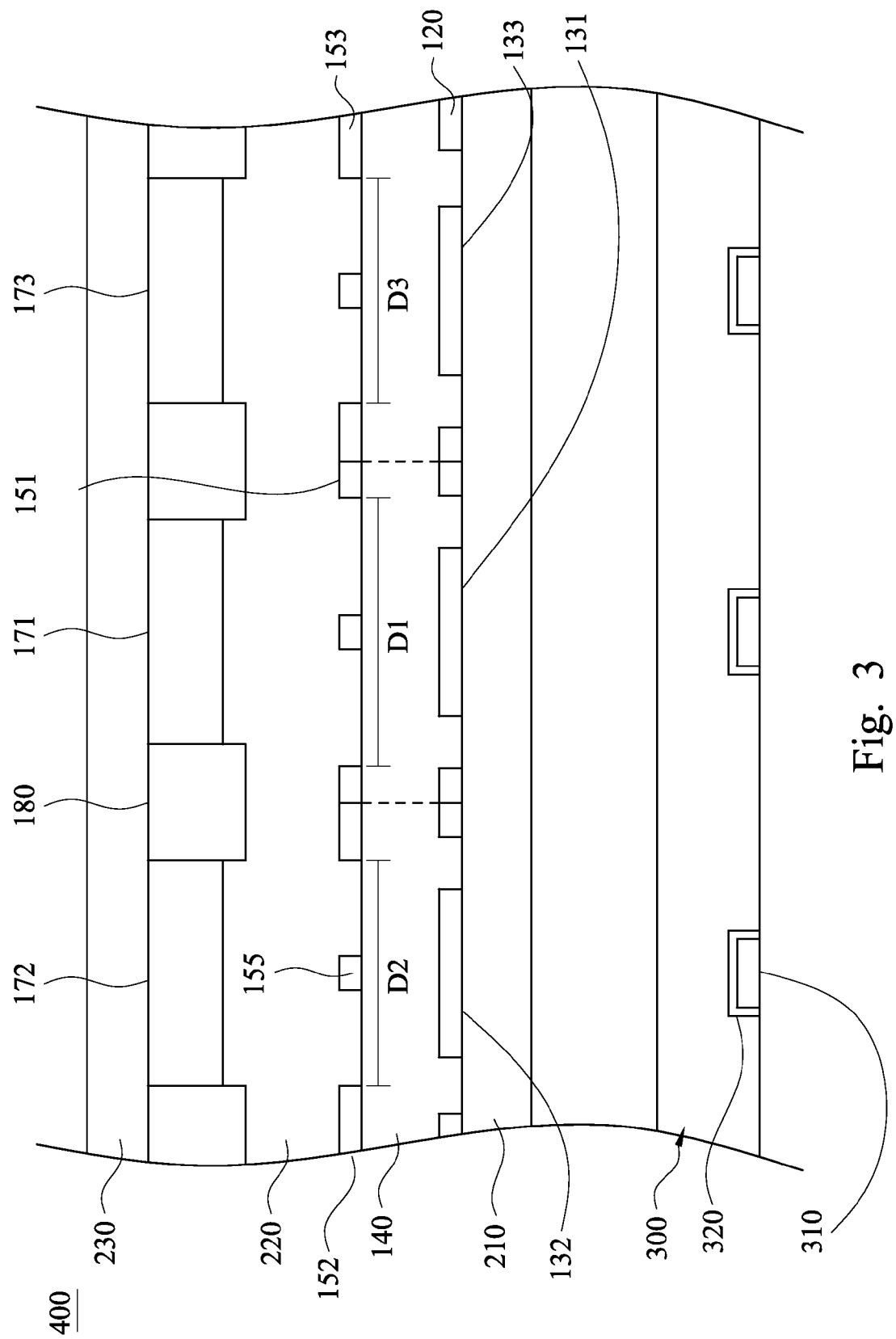
FIG. 3 is a cross-sectional view of a display according to one embodiment of this invention.

FIG. 3 is a cross-sectional view of a display 400 according to one embodiment of this invention. As shown in FIG. 3, a display 400 is provided. The display 400 includes the display panel 200 and a backlight module 300. The backlight module 300 is disposed on an outer side of the first substrate 210, such that the first substrate 210 is disposed between the display medium layer 220 and the backlight module 300.

The backlight module 300 emits a backlight with a specific spectrum, such that when the first pixel electrode 131, the second pixel electrode 132, and the third pixel electrode 133 are all turned on, the display 400 emits a white light. Specifically, the backlight module 300 can further include at least one blue light-emitting diode 310 and a yellow phosphor layer 320. The thickness of the yellow phosphor layer 320 matches the blue light-emitting diode 310, such that a light emitted by the blue light-emitting diode 310 becomes a yellowish white light after passing the yellow phosphor layer 320, and the yellowish white light becomes an adjusted white light after passing the display panel 200 when the first pixel electrode 131, the second pixel electrode 132, and the third pixel electrode 133 are all turned on.

If a backlight emitting from the backlight module 300 is not a pure white light but a colored white light, such as the yellowish white light when the backlight module 300 combines the blue light-emitting diode 310 and the yellow phosphor layer 320 and has a better luminous efficiency, the display panel 200 can adjust the backlight emitting from the backlight module 300 because the brightness of the backlight emitting from the first color filter layer 171 is greater than the brightness of the backlight emitting from the second color filter layer 172 or from the third color filter layer 173, such that the light passing the display panel 200 has a better white point to meet actual needs.

Specifically, a wavelength of the light passing through the first color filter layer is shorter than wavelengths of the light passing through the second color filter layer and from the third color filter layer. More specifically, the first color filter layer 171 can be a blue filter layer, the second color filter layer 172 can be a green filter layer, and the third color filter layer 173 can be a red filter layer. Therefore, the display panel 200 has a larger blue light transmittance than a red light transmittance and a green light transmittance. If the backlight is a yellowish white light, the backlight is adjusted to a white light with a better white point when the first pixel electrode 131, the second pixel electrode 132, and the third pixel electrode 133 are all turned on and when the backlight passes the display panel 200 and emits from the display 400.

When the backlight is a colored white light such as a reddish white light or a greenish white light, the display panel 200 may be adjusted to have a larger transmittance of a red light, a green light, or a colored light than transmittances of other colored light. Therefore, when the first pixel electrode 131, the second pixel electrode 132, and the third pixel electrode 133 are all turned on, the display 400 may emit a white light. In addition, the backlight module 300 may also be adjusted according to the design of the display panel 200.

Figure 4:
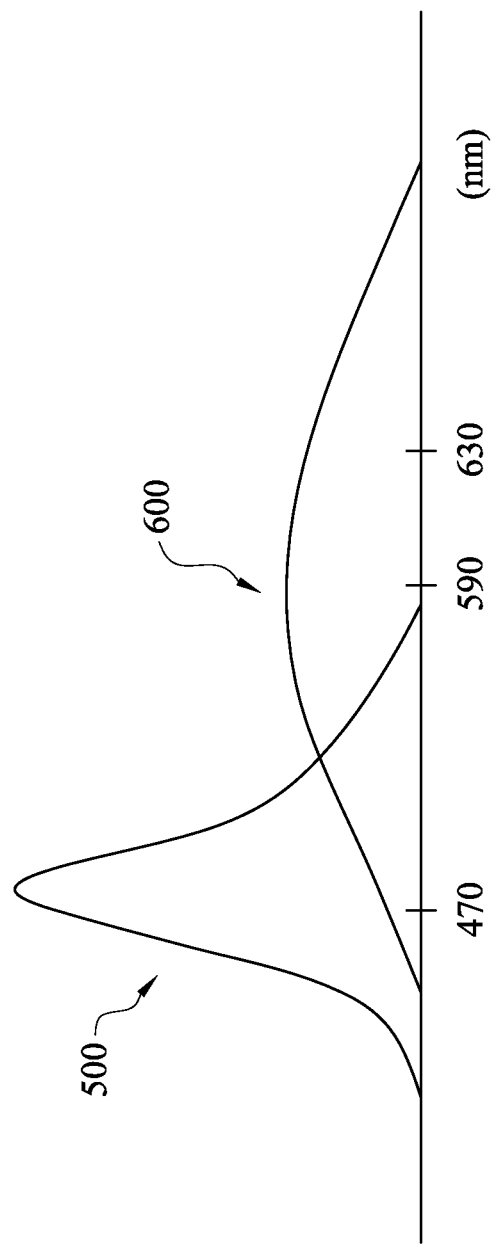
FIG. 4 shows spectrums generated by a conventional backlight module.

FIG. 4 shows spectrums generated by a conventional backlight module. The conventional backlight module includes a blue light-emitting diode and a yellow phosphor layer, so a spectrum 500 of a light emitted by the blue light-emitting diode and a spectrum 600 of a light emitted by the yellow phosphor layer may be generated. Adjusting a thickness of the yellow phosphor layer or a quantity of the phosphor in the yellow phosphor layer, an overall magnitude of the spectrum 600 of the light emitted by the yellow phosphor layer may be adjusted. The thickness of the yellow phosphor layer or the quantity of the phosphor in the yellow phosphor layer may be adjusted, such that a white light is generated after a light having the spectrum 500 and a light having the spectrum 600 are superimposed. Therefore, the backlight module may emit a white backlight.

If a thickness of the yellow phosphor layer 320 or a quantity of the phosphor in the yellow phosphor layer 320 is increased, the overall magnitude of the spectrum 600 of the light emitted by the yellow phosphor layer 320 is increased, and the overall magnitude of the backlight emitted by the backlight module 300 is enhanced without increasing the power consumption of the blue light-emitting diode 310. However, because the overall magnitude of the spectrum 500 does not change, the backlight becomes yellowish. If the backlight module 300 is used with the display panel 200 to enhance the blue light transmittance, the backlight is adjusted to the white light with the better white point when the first pixel electrode 131 the second pixel electrode 132, and the third pixel electrode 133 are all turned on and when the backlight passes the display panel 200 and emits from the display 400. Therefore, without increasing the power consumption of the backlight module 300, the display brightness of the display 400 is enhanced, so light emitted from the display 400 has a better set of color coordinates and thus has a better display quality.

As shown in FIG. 1, the first electrode branches 151, the second electrode branches 152, and the third electrode branches 153 on the first substrate 210 at least partially overlap with the data lines 120 respectively in a projection direction. Specifically, the first electrode branches 151, the second electrode branches 152, and the third electrode branches 153 neighboring to each other are connected to each other. More specifically, the common electrode 150 has a plurality of connecting portions 154 connecting the first electrode branches 151, the second electrode branches 152, and the third electrode branches 153. The data lines 120 have a plurality of corresponding center lines 121, and the connecting portions 154 on the first substrate 210 overlap with the center lines 121 in the projection direction.

Distances between the data lines 120 approximately equal to each other. People having ordinary skill in the art can make proper modification to the data lines 120 according to their actual needs.

The first electrode branches 151, the second electrodes 152, and the third electrode branches 153 respectively have a first electrode width WB, a second electrode width WG, and a third electrode width WR. The first electrode width WB is smaller than the second electrode width WG, and the first electrode width WB is smaller than the third electrode width WR. Specifically, the first electrode width WB is smaller than the second electrode width WG and the third electrode width WR of at least about 1 μm.

The display panel 200 can further includes a light shading layer 180 disposed between two of the first color filter layer 171, the second color filter layer 172, and the third color filter layer 173. Specifically, the light shading layer 180 on the first substrate 210 overlaps with the data lines 120 in the projection direction. A thickness of the light shading layer 180 is greater than thicknesses of the first color filter layer 171, the second color filter layer 172, and the third color filter layer 173.

The display panel 200 can further includes a plurality of common electrode branches 155. The common electrode branches 155 are disposed above the first pixel electrode 131, the second pixel electrode 132, and the third pixel electrode 133.

Figure 5:
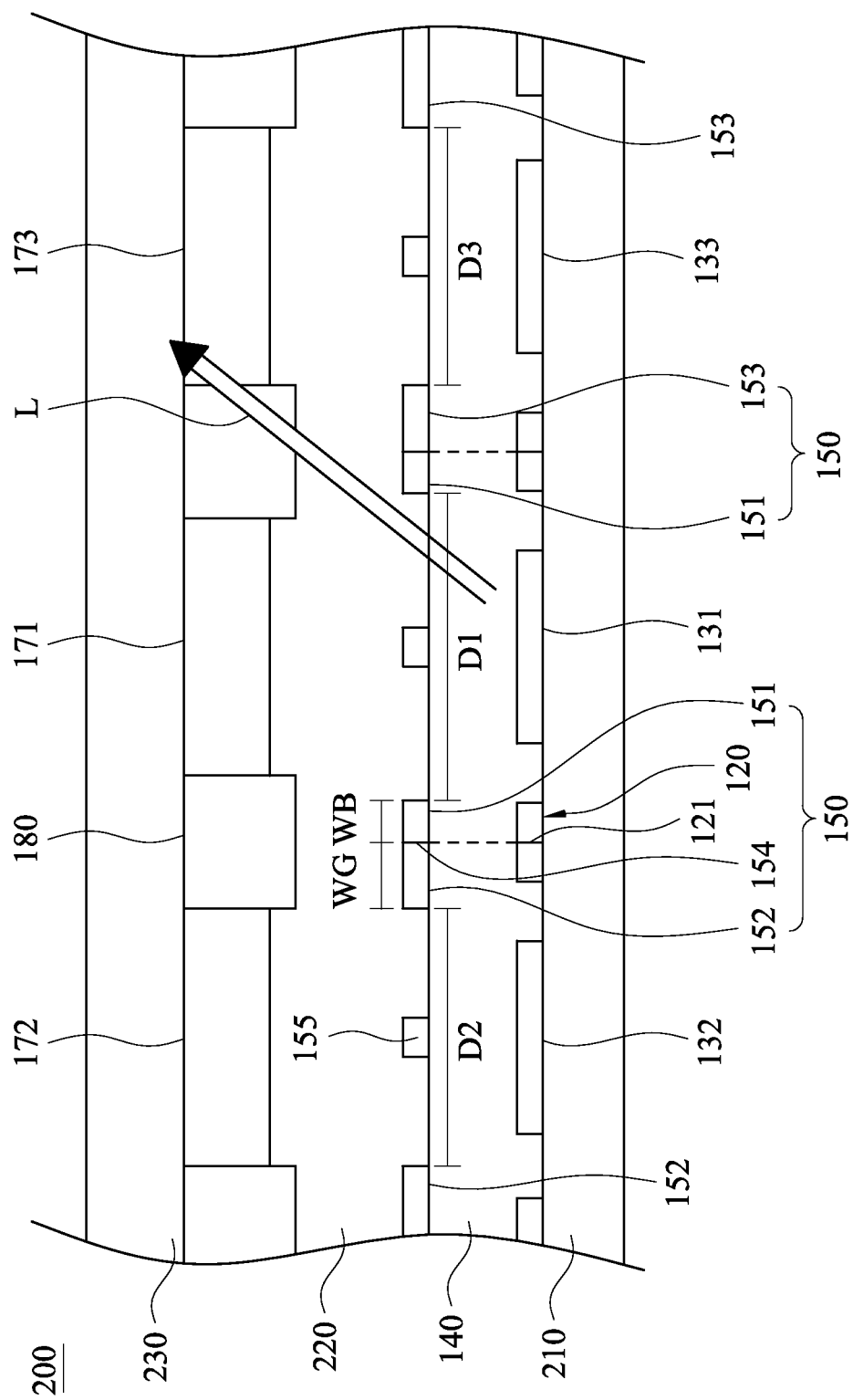
FIG. 5 is another schematic cross-sectional view of the display panel of FIG. 1.

FIG. 5 is another schematic cross-sectional view of the display panel 200 of FIG. 1. As shown in FIG. 5, a side leakage light may be generated in the display panel 200. Because the thickness of the light shading layer 180 is greater than the thickness of the color filter layers, the interference of different pixels due to the side leakage light may be prevented, and the color saturation of the display 400 in large viewing angle is maintained.

Figure 6:
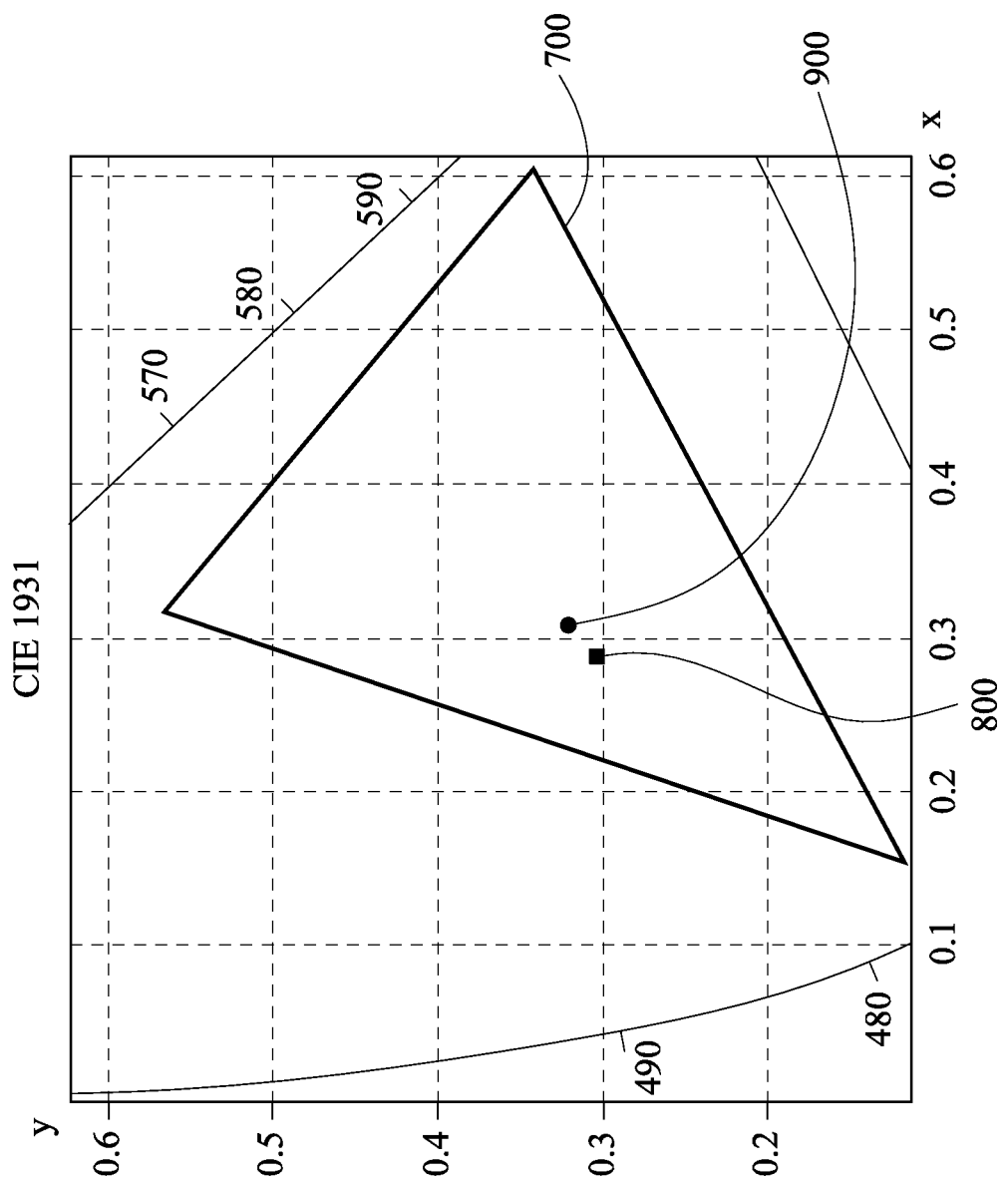
FIG. 6 shows a white point of a white light in a working example and a white point of a white light in a comparative example in a CIE 1931 color space.

FIG. 6 shows a white point 800 of a white light in a working example and a white point 900 of a white light in a comparative example in a CIE 1931 color space. If the display panel 200 of the present invention, in which the first interval D1 is greater than the second interval D2 and the third interval D3, is used with a backlight module emitting a white backlight, a white light emitted by the display panel 200 in a CIE 1931 color space has a white point 800. If a comparative display panel, in which the first interval D1 equals the second interval D2 and the third interval D3, is used with the backlight module emitting a white backlight, a white light emitted by the display panel in the CIE 1931 color space has a white point 900 situated in a gamut 700, and the white light emitted by the comparative display panel is a pure white light. Compared to the white point 900, the position of the white point 800 deviates to the blue end in the CIE 1931 color space. Therefore, the blue light transmittance of the display panel 200 is indeed shifted and enhanced. The display panel of the present invention presents a better chromaticity.

Performances of the display panel 200, the backlight module 300, and the display 400 of the present invention in a working example compared to performances of the conventional liquid crystal display (LCD) are listed:

|  | Blue Light Transmittance | Display Brightness of Backlight Module | Display Brightness of Display |
| --- | --- | --- | --- |
| Enhancement | 10% | 4% | 5.8% |

In the working example, the display brightness of the backlight module 300 is enhanced when the thickness of the yellow phosphor layer 320 or the quantity of the phosphor in the yellow phosphor layer 320 is increased. Because the first interval D1 is greater than a corresponding interval in the conventional LCD, the blue light transmittance of the display panel 200 is enhanced. By the two above factor, the display brightness and chromaticity of the display 400 is enhanced.

By adjusting the intervals between electrode branches of the high pixel per inch display panel, such that the blue light transmittance is larger than the red light transmittance and the green light transmittance, the display panel may collocate with a high efficient backlight module to achieve a better optical match. Even when the backlight module enhances the brightness of the backlight by adjusting a proportion of the phosphor, the white point of the yellowish white light emitted by the backlight module in the CIE 1931 color space still may be adjusted by the display panel of this disclosure. Therefore, the display brightness and chromaticity of the display panel is enhanced, and the color saturation of the display in large viewing angle is maintained.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A display panel, for a display device having a backlight module, the display panel comprising:
   a first substrate;
   a scan line disposed on the first substrate;
   a plurality of data lines disposed substantially in parallel on the first substrate;
   a first active component, a second active component, and a third active component electrically connected to the scan line and respectively electrically connected to the corresponding data lines;
   a first pixel electrode, a second pixel electrode, and a third pixel electrode respectively disposed between the data lines and respectively and electrically connected to the first active component, the second active component, and the third active component;
   a dielectric layer disposed on the first substrate and covering the first pixel electrode, the second pixel electrode, the third pixel electrode, and the data lines;
   a common electrode disposed on the dielectric layer and having a pair of first electrode branches, a pair of second electrode branches, and a pair of third electrode branches, the first electrode branches, the second electrode branches, and the third electrode branches being respectively and correspondingly disposed on both sides of the first pixel electrode, the second pixel electrode, and the third pixel electrode and being respectively and partially disposed above the data lines, the pair of the first electrode branches having a first interval therebetween, the pair of the second electrode branches having a second interval therebetween, and the pair of the third electrode branches having a third interval therebetween, wherein the first interval is greater than the second interval, the first interval is greater than the third interval, the first electrode branches, the second electrode branches, and the third electrode branches respectively have a first electrode width, a second electrode width, and a third electrode width, the first electrode width is smaller than the second electrode width, and the first electrode width is smaller than the third electrode width;
   a second substrate disposed opposite to the first substrate; and
   a display medium layer disposed between the first substrate and the second substrate.

2. The display panel of claim 1, wherein the first electrode branches, the second electrode branches, and the third electrode branches on the first substrate at least partially overlap with the data lines respectively in a projection direction.

3. The display panel of claim 1, wherein the first electrode branches, the second electrode branches, and the third electrode branches neighboring to each other are connected to each other.

4. The display panel of claim 3, wherein the common electrode has a plurality of connecting portions connecting the first electrode branches, the second electrode branches, and the third electrode branches, the data lines have a plurality of corresponding center lines, and the connecting portions on the first substrate overlap with the center lines in a projection direction.

5. The display panel of claim 1, wherein distances between the data lines equal to each other.

6. The display panel of claim 1, wherein the first electrode width is smaller than the second electrode width and the third electrode width of at least about 1 μm.

7. The display panel of claim 1, further comprising a first color filter layer, a second color filter layer, and a third color filter layer respectively disposed corresponding to the first pixel electrode, the second pixel electrode, and the third pixel electrode, wherein a wavelength of a light passing through the first color filter layer is shorter than wavelengths of light passing through the second color filter layer and from the third color filter layer.

8. The display panel of claim 7, wherein the first color filter layer is a blue filter layer, the second color filter layer is a green filter layer, and the third color filter layer is a red filter layer.

9. The display panel of claim 7, further comprising a light shading layer disposed between two of the first color filter layer, the second color filter layer, and the third color filter layer.

10. The display panel of claim 9, wherein the light shading layer on the first substrate overlaps with the data lines in a projection direction.

11. The display panel of claim 9, wherein a thickness of the light shading layer is greater than thicknesses of the first color filter layer, the second color filter layer, and the third color filter layer.

12. The display panel of claim 1, further comprising a plurality of common electrode branches respectively disposed above the first pixel electrode, the second pixel electrode, and the third pixel electrode.

13. The display panel of claim 1, wherein the display medium layer comprises a liquid crystal layer.

14. A display device, comprising:
a display panel, comprising:
a first substrate;
a scan line disposed on the first substrate;
a plurality of data lines disposed substantially in parallel on the first substrate;
a first active component, a second active component, and a third active component electrically connected to the scan line and respectively and electrically connected to the corresponding data lines;
a first pixel electrode, a second pixel electrode, and a third pixel electrode respectively disposed between the data lines and respectively and electrically connected to the first active component, the second active component, and the third active component;
a dielectric layer disposed on the first substrate and covering the first pixel electrode, the second pixel electrode, the third pixel electrode, and the data lines;
a common electrode disposed on the dielectric layer and having a pair of first electrode branches, a pair of second electrode branches, and a pair of third electrode branches, the first electrode branches, the second electrode branches, and the third electrode branches being respectively and correspondingly disposed on both sides of the first pixel electrode, the second pixel electrode, and the third pixel electrode and being respectively and partially disposed above the data lines, the pair of the first electrode branches having a first interval therebetween, the pair of the second electrode branches having a second interval therebetween, and the pair of the third electrode branches having a third interval therebetween, wherein the first interval is greater than the second interval, the first interval is greater than the third interval, the first electrode branches, the second electrode branches, and the third electrode branches respectively have a first electrode width, a second electrode width, and a third electrode width, the first electrode width is smaller than the second electrode width, and the first electrode width is smaller than the third electrode width;
a second substrate disposed opposite to the first substrate; and
a display medium layer disposed between the first substrate and the second substrate; and
a backlight module disposed on an outer side of the first substrate, such that the first substrate is disposed between the display medium layer and the backlight module.

15. The display device of claim 14, wherein the backlight module emits a backlight with a specific spectrum, such that the display device displays a white light when the first pixel electrode, the second pixel electrode, and the third pixel electrode are all turned on.

16. The display device of claim 14, further comprising a first color filter layer, a second color filter layer, and a third color filter layer respectively disposed corresponding to the first pixel electrode, the second pixel electrode, and the third pixel electrode, wherein a wavelength of a light passing through the first color filter layer is shorter than wavelengths of light passing through the second color filter layer and from the third color filter layer.

17. The display device of claim 16, wherein the first color filter layer is a blue filter layer, the second color filter layer is a green filter layer, and the third color filter layer is a red filter layer.

18. The display device of claim 17, wherein the backlight module comprises:
at least one blue light-emitting diode; and
a yellow phosphor layer, wherein a thickness of the yellow phosphor layer matches the blue light-emitting diode, such that a light emitted by the blue light-emitting diode becomes a yellowish white light after passing the yellow phosphor layer.

19. The display device of claim 18, wherein the yellowish white light becomes an adjusted white light after passing the display panel when the first pixel electrode, the second pixel electrode, and the third pixel electrode are all turned on.

* * * * *